June 23, 1964  C. H. PERKINS  3,138,028
SAFETY CLOSURE FOR PRESSURE INDICATING GAUGE
Filed Oct. 25, 1961

INVENTOR.
Charles H. Perkins.
BY A. A. O'Brien
ATTORNEY.

United States Patent Office 3,138,028
Patented June 23, 1964

3,138,028
SAFETY CLOSURE FOR PRESSURE
INDICATING GAUGE
Charles H. Perkins, Knoxville, Tenn., assignor to Robertshaw Controls Company, a corporation of Delaware
Filed Oct. 25, 1961, Ser. No. 147,544
7 Claims. (Cl. 73—416)

The present invention relates generally to pressure gauges and more particularly to an improved type of pressure gauge safety closure to relieve sudden increases in internal pressure caused by rupture of components within the case of the gauge.

Gauges of the type herein referred to are generally used for measuring pressure in systems containing liquids or gases in a compressed state. These gauges are usually comprised of a Bourdon-type tube adapted to displace a needle indicator relative to a dial plate on the face of said gauge. The Bourdon tube generally has a high internal pressure, and rupture of this tube may cause an explosion within the casing of the pressure gauge thereby blowing out the dial plate and the glass cover. This situation would present a safety hazard to persons nearby and also bring about serious damage to the pressure gauge. In order to obviate the aforementioned dangers, it has been good practice to construct pressure gauges with safety closures which will blow out upon a sudden increase in internal pressure to thereby relieve said pressure without damage to the pressure gauge or injury to persons nearby.

It is a principal object of the present invention to provide a pressure gauge case having new and improved safety closure means to relieve sudden increases in pressure within the gauge.

It is a further object of the present invention to provide a new and improved blowout plug for the rear wall of a pressure gauge case which is a separate piece of resilient material, and which will bodily blow out from the case upon a small rise in gauge case internal pressure.

It is a further object of the present invention to provide a safety closure for a pressure gauge case which is corrosion resistant and which will not freeze or corrode upon prolonged exposure in a corrosive atmosphere.

It is a further object of the present invention to provide a safety closure for a pressure gauge case which will effectively seal the interior of the case from dust and corrosive vapors or fumes.

It is a further object of the present invention to provide a safety closure for a pressure gauge case which may be readily removed in the event that the gauge mechanism needs servicing or recalibrating.

It is a further object of the present invention to provide a safety closure for a pressure gauge case which is inexpensive and easy to manufacture, yet will retain its sealing properties and its ability to blow out at a very low case internal pressure, even though subjected to ambient conditions of widely varying relative humidities and temperatures.

It is a further object of the present invention to provide a safety closure mounted in the rear of a solid front pressure gauge case in such a manner as to be rigid and to prevent the safety closure from being shoved into the gauge internal mechanism due to an accidental inward push on the safety closure, thereby to prevent damage to the safety closure and to the gauge.

Briefly, the present invention may be described as comprising a closure plate formed of a flat, disc-like member, made of a resilient material, such as polypropylene, and having an integrally formed resilient lip coextensive with its outer periphery. The resilient lip is formed integrally of the closure plate by an annular groove which is cut in one face of the closure plate proximate, and coextensive with, the outer edge thereof. The outer edge of the plate is slanted so that one face of said plate defines a larger area than the other face. The aforementioned annular groove is cut into the face defining the larger area. A pressure gauge case has an opening in the rear thereof to receive the closure plate. The opening in the case is of a depth commensurate with the thickness of the disc-like member. The edge of said opening is formed of two oppositely-directed slanted surfaces. The slanted surfaces are formed so that the diameter of the opening decreases and then increases, going in a direction of increasing depth. The closure plate is inserted in the case opening with its larger-area surface facing the interior of the case. As the resilient lip engages the first slanted surface on the edge of the opening, the lip is deflected inwardly and the closure plate is guided into position in the case opening. As the leading edge of the lip passes the point of minimum diameter of the opening, the lip tends to return to its initial position. When the closure plate is in its final position in the case opening, the resilient lip will have returned to its initial position and the slanted edge of the closure plate will be in engagement with the second slanted surface of the edge of the opening, in a manner whereby the closure plate will be retained in position in the opening. Upon an increase in the internal pressure of the gauge case a force will be exerted on the inner face of the closure plate and the resilient lip will tend to be flexed inwardly as the closure plate is blown out of the case opening. Therefore, in the event of a rupture in the Bourdon tube, the closure plate will blow-out thereby relieving the case internal pressure without damage to the pressure gauge case or injury to persons standing nearby.

Further features and advantages of the invention will become apparent from the following description taken in connection with the accompanying drawings wherein.

Figure 3:
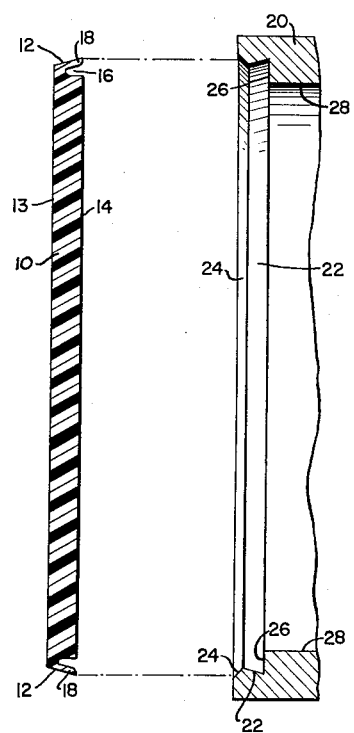
FIG. 3 is an exploded partial sectional view of the same section of FIG. 2 but on an enlarged scale.

With reference to FIG. 3, there is shown a sectional view of the closure plate 10. The plate 10 is formed of any suitable resilient material, such as polypropylene, and although the closure plate 10 is shown as a circular disc, it is to be understood that any suitable, effective shape may be employed without departing from the scope of the present invention. The closure plate 10 has oppositely disposed surfaces 13 and 14 and a peripheral edge 12 with a taper increasing from surface 13 to surface 14. The edge 12 is slanted in a manner whereby the surface 14 defines a larger area than the surface 13. Adjacent the edge 12, an annular groove 16 is cut in the surface 14 and is so positioned proximate the edge 12 to form resilient lip 18 integrally with closure plate 10, and coextensive with the periphery thereof.

With reference also to FIG. 3, there is shown in section a portion of a pressure gauge casing 20. A bore, or cylindrical opening, internally of the case 20 is defined by the annular wall 28 which terminates in a counter-bore, or opening, on the surface of the case, defined by a base portion 26 and surfaces 22 and 24. Surfaces 22 and 24 are slanted, with surface 22 extending from the base 26 in a direction of decreasing diameter of the opening, and surface 24 extending in a direction of increasing diameter from the point of minimum diameter to the outer surface of the case 20. Thus, the surfaces 22 and 24 are of a substantially V-shaped configuration, with the base of the V-shape extending toward the center of the opening or counter-base. The opening defined by surfaces 22 and 24 is adapted to receive closure plate 10.

During installation of the closure plate in the casing 20, the surface 24, which is slanted as shown, first engages the sealing lip 18. As the closure plate 10 is inserted into the opening, the sealing lip 18, bearing against the slanted surface 24, is flexed inwardly thereby guiding the closure plate 10 into the opening in the casing 20.

Figure 1:
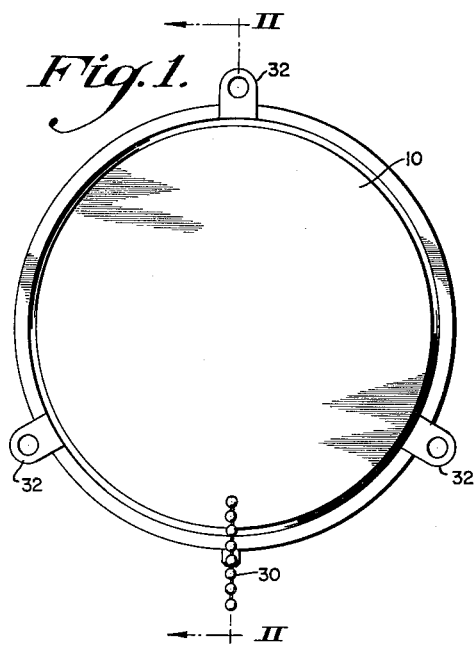
FIG. 1 is a rear elevation of a case embodying this invention.
Figure 2:
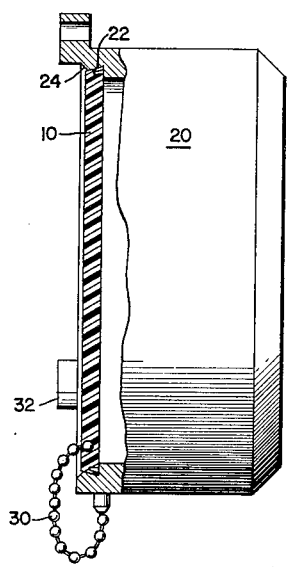
FIG. 2 is a side elevation of the case with a partial section taken along the line II—II of FIG. 1.

The entire assembly, with the closure plate 10 in position in the casing 20, is shown in FIGS. 1 and 2, FIG. 2 being a view with a partial section taken along the line II—II of FIG. 1. When the closure plate 10 is in its final position in the casing 20, the surface 14 of the closure plate bears against a base portion 26 of the opening in the casing 20. With the closure plate in this position, the sealing lip 18 will have returned to its initial unflexed position, and the outer edge 12 of the closure plate 10 will bear against the surface 22 of the opening in the casing 20 in a manner whereby the closure plate 10 is maintained in place in the opening.

The sidewall 28 in the casing 20 defines a circular opening in the case for applying the internal pressure of the case 20 to the surface 14 of the closure plate 10. When there is a sudden increase in the internal pressure of the case 20, a force will be exerted on the surface 14 of the closure plate 10 tending to push the closure plate outwardly of the opening in the case 20. When this occurs, the sealing lip 18 will once again be flexed inwardly and when the force applied to the surface 14 is sufficient to overcome the retaining force brought about by engagement of edge 12 with surface 22, the sealing lip 18 will be flexed a sufficient amount to enable the closure plate 10 to be blown out of the opening in the case 20.

As has been stated, such an increase in the internal pressure of the case 20 would be brought about by an eventuality such as a rupture of the Bourdon tube, not shown, in the case 20. Thus, the closure plate 10 may be blown out without damage to the pressure gauge case or to the closure plate 10 which may be reinserted at a proper time.

With the closure plate 10 in place in the opening in the case 20, surfaces 14 and 26 cooperate to prevent the closure plate from accidentally being pushed into the gauge. Also, the closure plate 10 is formed of a material rigid enough to prevent such an occurrence.

Additionally, since the closure plate is formed of a resilient material different from that of the case 20, the closure plate 10 may undergo greater dimensional changes than the case 20 when exposed to widely varying relative humidities and ambient temperatures. It will be apparent that the sealing lip 18 will also operate to compensate for these dimensional changes to maintain a seal and to prevent the closure plate 10 from falling out of the case 20 at low ambient temperatures. At high ambient temperatures and/or relative humidity, the sealing lip 18 compensates for expanding dimensional changes in the closure plate 10 to maintain a seal which will blow the closure plate out of the case 20 at a relatively low case internal pressure.

With reference to FIG. 2, there is shown a link or chain 30 which is embedded in the plate 10 and attached to the case 20 by any suitable means thereby to insure that the closure plate 10 remains in proximity with the case 20 when blowout occurs. With reference to FIG. 1, there is shown a series of lugs 32 attached to the case 20 to permit the case to be affixed at any desired location by means of suitable connection means, such as screws or the like. The chain 30 and the lugs 32 are shown for convenience and form no part of the present invention.

It will be apparent from the foregoing that the closure device of the present invention is a safe, convenient, economical and easily manufactured means for relieving internal pressure in pressure gauge cases. In addition to its blowout feature, the structure of the present invention also provides an effective and durable seal against entry of foreign materials into the pressure gauge case. It will also be apparent that the structure of the present invention provides closure means which are readily and easily removed and replaced to give access to the case interior for any desired purpose.

Although in the foregoing, the present invention has been described with reference to a preferred specific embodiment thereof, it is to be understood that the scope of the present invention is not to be limited thereto. It will be apparent that many substitutions and modifications may be made to the novel structure disclosed herein without departing from the spirit and scope of the present invention. It is therefore intended that the scope of the present invention not be limited to the specific structural embodiments disclosed in the foregoing, but in accordance with the appended claims.

What is claimed is:

1. A safety closure for a case which may be subjected to sudden increases in internal pressure comprising, a closure plate of relatively thin resilient material formed as a conic section and having an annular groove therein, said groove extending from a base surface of said closure plate partially therethrough, and positioned proximate the outer periphery of said closure plate and coextensive therewith, a flexible sealing lip on the periphery of said closure plate formed by said annular groove, a case including a bored wall defining an opening with a depth adapted to receive said closure plate, said wall having an outer surface, a base surface adapted to engage the base surface of said closure plate, a first slanted surface coextensive with the periphery of said wall and extending in a direction inwardly of said opening from the outer surface of said case to a point intermediate said depth, and a second slanted surface coextensive with the periphery of said wall and extending in a direction outwardly of said opening from such point intermediate to the base surface of said wall, said first slanted surface adapted to engage said flexible sealing lip when said closure plate is initially inserted in said opening to flex said sealing lip inwardly of said closure plate to guide said closure plate into said bored wall, said second slanted surface adapted to engage the outer edge of said closure plate when said closure plate is in a final position in said bored wall to hold said closure plate in said final position in a manner whereby an increase in the internal pressure of said case will cause said closure plate to be blown from said bored wall.

2. A safety closure for a case which may be subjected to sudden increases in internal pressure comprising, a closure plate formed as a disc of resilient material having a first surface, a second surface, and an outer edge, said outer edge slanted to have said first surface define a lesser area than said second surface, a flexible lip portion integral with said closure plate coextensive with the periphery thereof, an annular groove in said closure plate extending from said second surface of said closure plate partially therethrough, and positioned proximate the edge thereof, and means defining an opening in said case adapted to receive said closure plate, said means having a base portion and being of a depth whereby said base portion is adaptable to engage said second surface of said closure plate when said plate is finally positioned in said means, said means having a periphery formed of a first inwardly slanted surface and a second outwardly slanted surface, said first inwardly slanted surface being adapted to engage said lip portion when said closure plate initially engages said means to flex said lip portion inwardly of said closure plate and guide said closure plate to a final position in said means, said second outwardly slanted surface being adapted to engage the outer edge of said closure plate when said plate is in a final position to hold said plate in place in said means in a manner whereby a sudden increase in internal pressure in said case exerts a force on said second surface of said closure plate to blow said plate from said means.

3. A safety closure for a case which may be subjected to sudden increases in internal pressure comprising, a closure plate formed of a flat circular disc of resilient material having a slanted edge, said closure plate having an inner surface and an outer surface, said edge slanted to have said inner surface define a larger area than said outer surface, a flexible lip portion integral with said closure plate and coextensive with the circumference thereof, a first outer side of said lip being formed of the slanted edge of said closure plate, and a second inner side of said lip being formed of one side of an annular groove in said closure plate, said groove being coextensive with the circumference of said closure plate and positioned proximate said slanted edge to extend from the inner surface of said closure plate partially therethrough, and a case including means defining a circular opening with a depth substantially commensurate with the thickness of said closure plate and defining a base portion adapted to engage the inner surface of said closure plate, said means having an edge formed of a first slanted surface coextensive with the circumference of said opening defined by said means and extending in a direction inwardly thereof from an outer surface of said case to a point intermediate said depth, and a second slanted surface coextensive with such circumference and extending in a direction outwardly of said opening defined by said means from such point intermediate said depth to said base portion, said first slanted surface adapted to engage said lip portion to flex it inwardly of said closure plate to guide said closure plate into position in said opening defined by said means, said second slanted surface adapted to engage said slanted edge of said closure plate to hold said closure plate in final position in said opening defined by said means with said inner surface of said closure plate in engagement with said base portion in a manner whereby a sudden increase in the internal pressure of said case exerts a force on the inner surface of said closure plate to flex said lip portion and blow said closure plate from said opening defined by said means.

4. In an instrument case having a safety closure adapted to blow-out in response to a predetermined pressure, the combination comprising a case, an opened wall on said case having peripheral surface means defining an opening, a safety closure element being made of different material from said case and having an outer edge to engage said peripheral surface means and close the opening in said wall, flexible lip means on said closure element engaging said peripheral surface means to retain said closure element in said opened wall, said flexible lip means being defined by groove means in one face of said closure element adjacent and coextensive with the outer edge of said closure element to compensate for dimensional changes between said case and said safety closure element.

5. The combination as recited in claim 4 wherein peripheral surface means includes first and second surfaces, said first surface being initially engaged by said flexible lip means to inwardly flex the same and to guide said closure element into said opened wall, and said second surface being engaged by said flexible lip means in an unflexed condition for retaining said closure element in said opened wall whereby an increase of pressure in said case will cause said closure element to be blown from said opened wall.

6. The combination as recited in claim 5 wherein said first and second surfaces are slanted toward each other along a longitudinal axis defined by said case and said closure element.

7. In an instrument case having a safety closure adapted to blow-out in response to a predetermined pressure, the combination comprising a case, an opened wall on said case having peripheral surface means defining an opening, a safety closure element being made of different material from said case and adapted to close the opening in said wall, said closure element including inner and outer surface areas and an edge portion having an increasing taper therebetween from said outer surface area to said inner surface area, and flexible lip means on said closure element engaging said peripheral surface means to retain said closure element in said opened wall, said flexible lip means being defined by said edge portion and groove means in said inner surface area adjacent said edge portion to compensate for dimensional changes between said case and said safety closure element.

References Cited in the file of this patent

UNITED STATES PATENTS

| | | |
|---|---|---|
| 1,905,301 | Nash | Apr. 25, 1933 |
| 2,693,896 | Brown | Nov. 9, 1954 |